United States Patent [19]
Righetti

[11] Patent Number: 5,182,875
[45] Date of Patent: Feb. 2, 1993

[54] FLEXIBLE TYPE FISHING LURE
[75] Inventor: Randall D. Righetti, Upland, Calif.
[73] Assignee: John Alexander Righetti, Pomona, Calif. ; a part interest
[21] Appl. No.: 843,178
[22] Filed: Feb. 28, 1992
[51] Int. Cl.$^5$ .............................................. A01K 85/00
[52] U.S. Cl. ................................ 43/42.24; 43/42.09; 43/42.47
[58] Field of Search ................. 43/42.24, 42.47, 42.09, 43/42.7, 42.39

[56] References Cited

U.S. PATENT DOCUMENTS

| | | | |
|---|---|---|---|
| 1,359,618 | 11/1920 | Oliver | 43/42.47 |
| 1,393,617 | 10/1921 | Frame | 43/42.47 |
| 1,442,332 | 1/1923 | Frament | 43/42.47 |
| 1,557,644 | 10/1925 | Andersen | 43/42.47 |
| 1,792,366 | 2/1931 | Ettles | 43/42.47 |
| 2,635,381 | 4/1953 | Coons . | |
| 2,722,766 | 11/1955 | Accetta . | |
| 2,971,285 | 2/1961 | Murawski | 43/42.24 |
| 3,070,917 | 1/1963 | Rowe . | |
| 3,133,372 | 5/1964 | Born | 43/42.7 |
| 3,367,059 | 2/1968 | Puls | 43/42.24 |
| 3,490,165 | 1/1970 | Thomassin . | |
| 3,537,207 | 11/1970 | McClellan | 43/42.24 |
| 3,735,518 | 5/1973 | Kleine et al. . | |
| 3,760,528 | 9/1973 | Moore . | |
| 3,992,800 | 11/1976 | Neil . | |
| 4,312,148 | 1/1982 | Hardwicke . | |
| 4,471,556 | 9/1984 | Dworski | 43/42.47 |
| 4,573,283 | 3/1986 | Pippert . | |
| 4,893,430 | 1/1990 | Barfield . | |
| 5,070,639 | 12/1991 | Pippert . | |

FOREIGN PATENT DOCUMENTS 2455432 11/1980 France .

Primary Examiner—Kurt C. Rowan
Attorney, Agent, or Firm—Thomas I. Rozsa

[57] ABSTRACT

The present invention is a fishing lure which features a segmented body connected by a thin flexible membrane, an airfoil type shape for lift, properly weighted and having a diving bill, where the combination of these features causes a serpentine or side to side motion at suspended depths through the water.

30 Claims, 2 Drawing Sheets

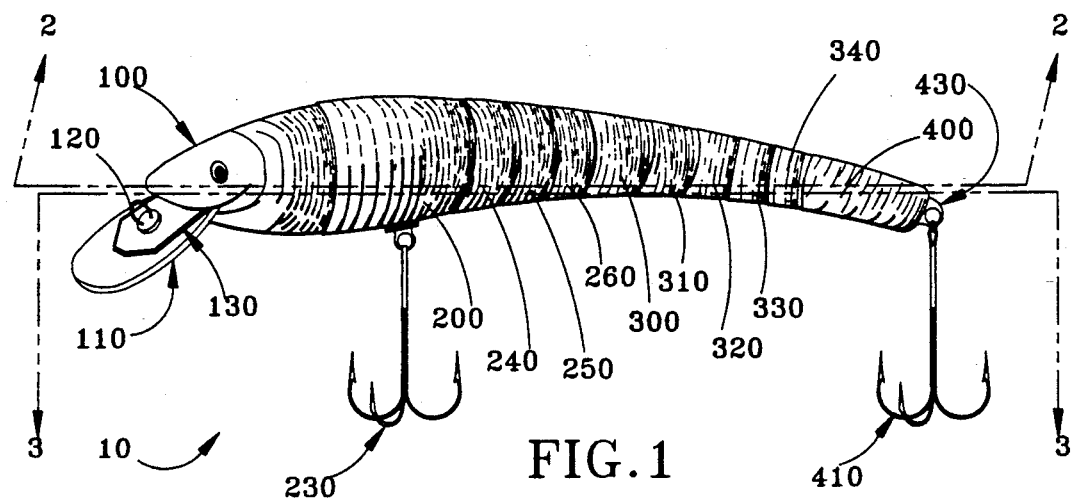
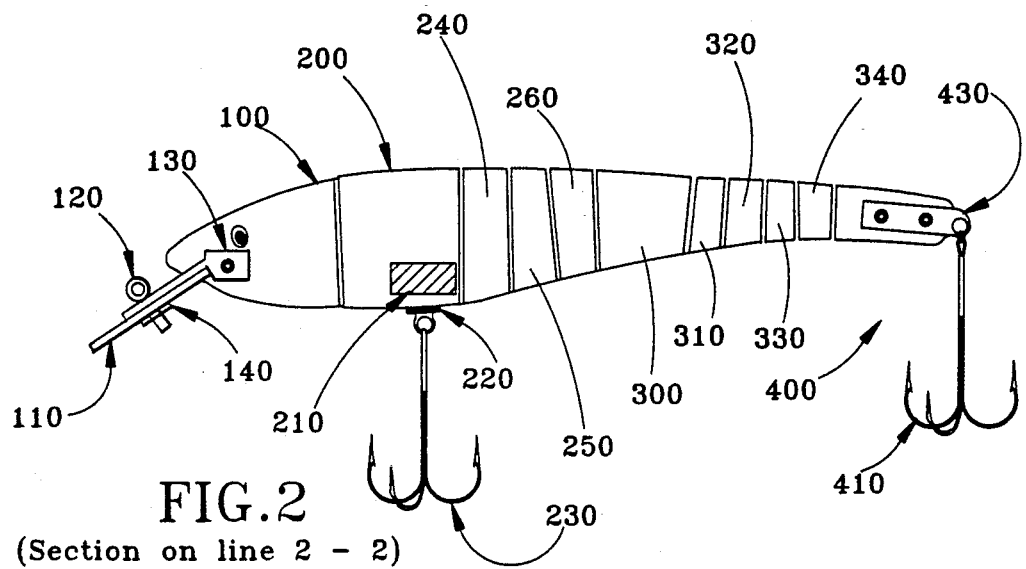
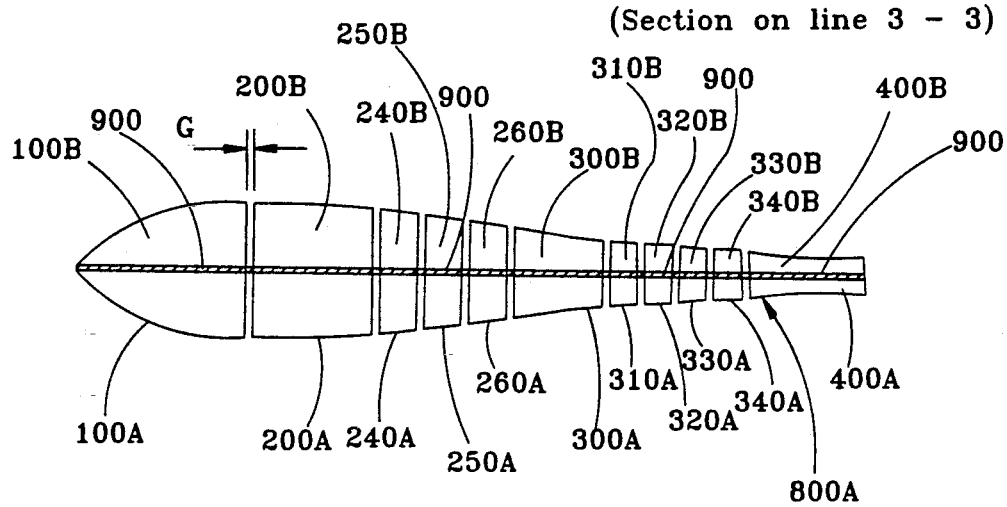

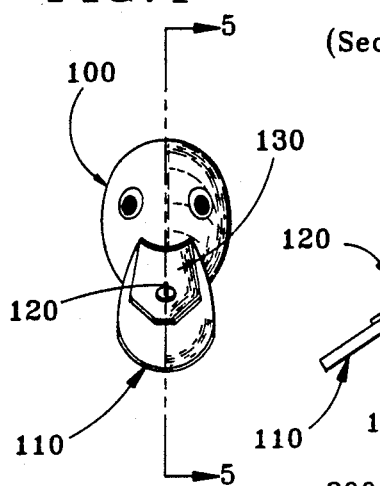
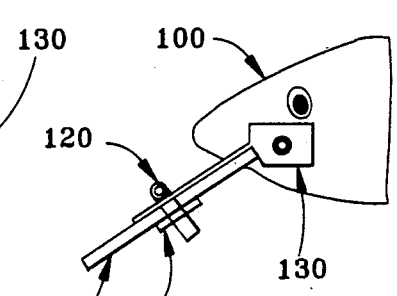
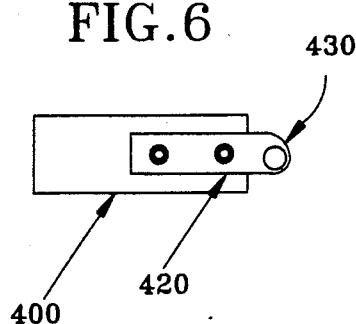
FIG.4  FIG.5 (Section on line 5-5)  FIG.6
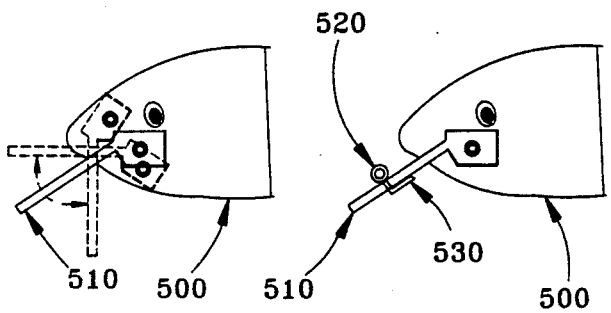
FIG.9  FIG.8  FIG.7
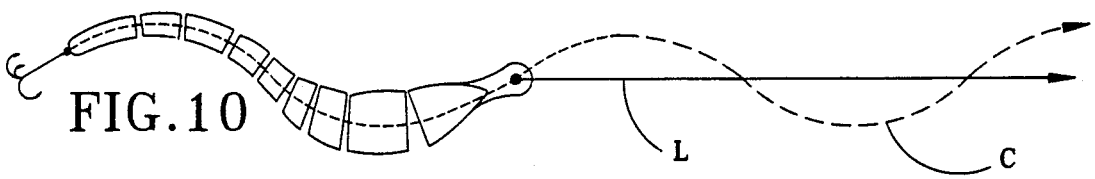
FIG.10
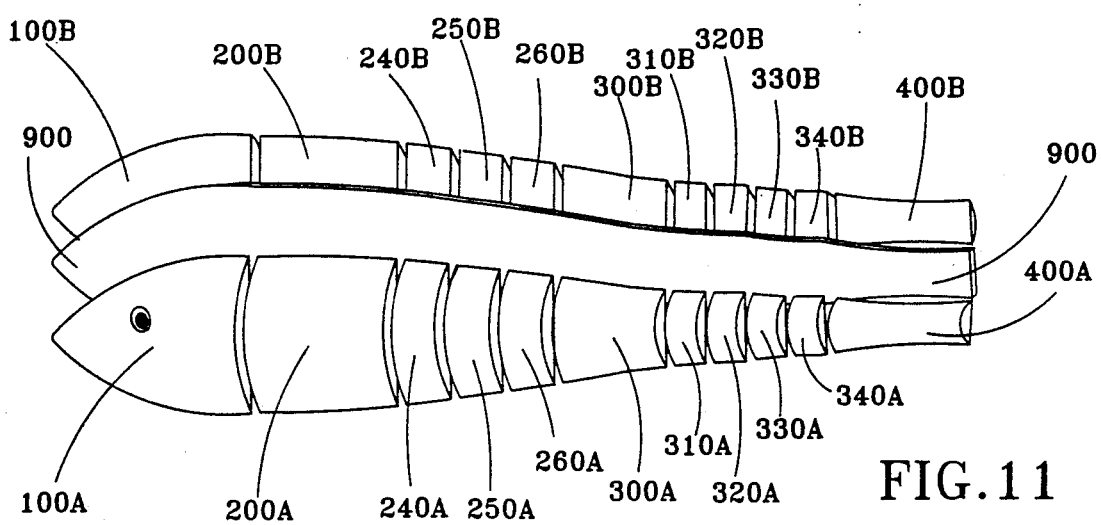
FIG.11

FLEXIBLE TYPE FISHING LURE

BACKGROUND OF THE INVENTION

1. Field of the Invention

The present invention relates to fishing lures. Specifically, the present invention relates to a unique fishing lure which features the combined effect of: a segmented body connected by a thin flexible membrane for serpentine or side to side motion; an airfoil type shape for lift; a balanced weight to establish a center of gravity; and, a diving bill to counterbalance lift effects and provide action at suspended depths through the water.

2. Description of the Prior Art

Artificial fishing lures are widely used as substitutes for actual bait fish in the sport of fishing. Various types of fishing lures exist. Fishing lures which generally emulate the motion of actual bait fish are desirable because predator fish are often tricked into biting on these lures. A substantial cost savings is derived from using artificial lures over live bait because artificial lures can be used repeatedly. Depending on the curiosity and nature of the predator fish, the use artificial lures can be preferable over live bait.

It will be beneficial if a new fishing lure is introduced which resembles a fish and has hydrodynamic features which cause it to move in a manner similar to that of a real fish and which attracts predator fish to strike.

The following prior art patents are found pertinent to this field of art:

1. French Patent No. 2,455,432 issued to Thomassin (hereafter the "Thomassin French Patent") on Nov. 28, 1980 for "Flexible Animated Fishing Lure".

2. U.S. Pat. No. 3,490,165 issued to Thomassin (hereafter the "Thomassin U.S. patent) on Jan. 20, 1970 for "Lure for Fishing".

3. U.S. Pat. No. 3,735,518 issued to Kleine et al. (hereafter the "Kleine patent") on May 29, 1973 for "Fishing Lure Having Detachably Positioned Hooks".

4. U.S. Pat. No. 3,992,800 issued to Neil (hereafter the "Neil patent") on Nov. 23, 1976 for "Action Lure".

5. U.S. Pat. No. 4,573,283 issued to Pippert (hereafter the "Pippert patent") on Mar. 4, 1986 for "Fishing Lure".

6. U.S. Pat. No. 2,635,381 issued to Coons (hereafter the "Coons patent") on Apr. 21, 1953 for "Fish Lure".

7. U.S. Pat. No. 3,070,917 issued to Rowe (hereafter the "Rowe patent") on Jan. 1, 1963 for "Fish Lure".

8. U.S. Pat. No. 5,070,639 issued to Pippert (hereafter the "Pippert patent") on Dec. 10, 1991 for "Fishing Lure System and Rattle Therefor".

9. U.S. Pat. No. 2,722,766 issued to Accetta (hereafter the "Accetta patent") on Nov. 8, 1955 for "Fish Lure".

10. U.S. Pat. No. 3,760,528 issued to Moore (hereafter the "Moore patent") on Sep. 25, 1973 for "Plastic Fishing Worm".

11. U.S. Pat. No. 4,312,148 issued to Hardwicke (hereafter the Hardwicke patent) on Jan. 26, 1982 for "Weedless Fishing Lure".

12. U.S. Pat. No. 4,893,430 issued to Barfield (hereafter the "Barfield patent") on Jan. 16, 1990 for "Multi-Jointed Beaded Fishing Worm Lure".

13. U.S. Pat. No. 4,998,372 issued to Reed (hereafter the "Reed patent") on Mar. 12, 1991 for "Artificial Fishing Lure".

The present invention consists of a multiplicity of multi-segmented plugs with a thin flexible membrane running down the center so that the plugs move in effect from side to side in a serpentine motion. The lure is shaped in the general shape of an airfoil so that there is lift as well as the serpentine motion while the fishing lure is pulled through the water. There is also a bill in the front of the lure which serves as a diving bill. There is also a center of gravity weight located approximately in the area of the segment adjacent to the front section so that the entire fishing lure operates like an airplane with lift on the tail and a downward force on the front part of the diving bill where the thin flexible membrane is a very unique feature of the device and serves to cause a serpentine or side to side motion as the lure is pulled through the water. The thin flexible membrane in the middle is usually made of aircraft type fiber such as polyfiber.

The Thomassin French Patent discloses a flexible animated fishing lure which has a spoon type blade at the head and generates undulating movement in its segment body. The spoon type blade pivots at the head of the lure. The movement, described as centrifugal, is imparted to the main part of the lure where the embodiment of a segmented fish with dummy fins and tail moves continuously.

In contrast, the present invention's generally serpentine motion through the water is due to the combined effects of the airfoil type design, the diving bill, the segmented sections with gap spacing between segments and the weight placement. The present invention carefully considers gap spacing between segments and the segments in the present invention have a lateral movement because of the method of attachment of the segments, which is by a flexible membrane. The membrane attachment of sections, gap spacing and overall hydrodynamic fish like movement of the one-piece body, are key attributes of the design, and are not present in the Thomassin patent.

The Thomassin U.S. patent discloses a lure for fishing which exhibits a body of a flexible material which includes a head, a ribbed diaphragm and a tail. A weight is horizontally disposed in the head and an elongated blade is secured to the head and passes through the body of the lure.

The ribbed diaphragm in the Thomassin U.S. patent is of a one piece structure where ridges are placed along the sides which allow for lateral flexibility. This differs considerably from the present invention where the gap spacing and method of attachment of the sections are crucial and cause the lure to move in a smooth serpentine or side to side motion. The airfoil type design of the body is not present in the Thomassin U.S. patent. Furthermore, the Thomassin U.S. patent claims a ribbed diaphragm attaching to a head which has a blade insertion connection which is very different from the smooth body, hydrodynamic structure of sections in the present invention.

The Kleine patent discloses a fishing lure having detachably positioned hooks. The overall structure of the Kleine patent involves a series of joined segments which allow it to move in a lateral manner, simulating the motion of a fish. The lure body has a common rib, formed of a flexible gauze like material, which extends along the length of the lure with a series of jointed body portion segments.

In contrast, the present invention comprises the combination of a diving bill, weight and airfoil type shape which is not present in the Kleine patent. These features, along with the segmented structure for lateral serpentine or side to side motion, distinguish the present invention from the Kleine patent.

The Neil patent discloses an action lure which has a head, tail and flexible core connecting the head and the tail with rib members extending radially from the core, concentrically placed with respect to the core. When air bubbles are trapped within the pockets along the length of the rib members, it emits a sound and changes the rate of descent to provide a life like appearance.

Again, the Neil patent device does not have the critical features of the present invention but only has, in similar relation, a ribbed body of sections which are radially extended from the core.

Other prior art patents which are not as similar to the present invention are described here briefly for reference.

The Pippert patent discloses a fishing lure comprised of a preformed cavity extending generally lengthwise through the body.

The Coons patent discloses a fish lure which has a generally spoon shaped solid body construction where it is specifically designed to have a life-like appearance and to dart or zig-zag through the water.

The Rowe patent discloses a fish lure of a generally molded body design to resemble a fish, with weighted portions mounted on a thin flexible wire extending longitudinally from the head to the tail portion.

The Pippert patent discloses a fishing lure system and rattle which comprises a rigid head and body construction and has a rattle assembly disposed in a cavity of the body.

The Accetta patent discloses a fish lure comprised of a head and a freely flexible elongated body which project a longitudinal series of freely flexible waving fingers or feeler strips.

The Moore patent discloses a plastic fishing worm which contains a metallic hollow chamber which produces a fish-attracting noise when the lure is pulled through the water.

The Hardwicke patent discloses a weedless fishing lure comprised of a generally worm-like body with a weed-guard appendage at the front end where the leader is attached.

The Barfield patent discloses a multi-jointed beaded fishing worm lure which simulates the natural motion of a worm. A plurality of generally spherical beads are connected by a continuous flexible strand.

The Reed patent discloses an artificial fishing lure which has a slightly U-shaped surface and a convex bottom portion and is comprised of an elongate, straight line radially asymmetrical body. The body has a plurality of segments which include a leading end, a trailing end and a hinge means for coupling lead and trailing ends. The lure moves through the water with a random and erratic motion.

SUMMARY OF THE PRESENT INVENTION

The present invention is an improved fishing lure which involves the general configuration of multisegmented plugs connected by a thin flexible membrane, airfoil shape, weights and diving bill which cause a generally serpentine or side to side motion when the lure is pulled through the water.

In the sport of fishing, there is a need for attractive fish like structures which resemble small bait fish by means of its visual features (i.e. size, shape, color, etc. . . ) and by the nature of its movement through the water. Depending on the curiosity of the predator fish, the action of a lure could cause predator fish to strike.

The present invention combines the features of: a segmented body, with a specific gap spacing between segments, which is connected by a thin flexible membrane for a serpentine or side to side motion; an airfoil type shape for lift; and a weighted structure with a downward force at the diving bill for counterbalance of the lift effect at suspended depths through the water. The present invention provides all of the above features in a design which is also easy to manufacture.

It has been discovered that a general configuration of multisegmented plugs, with a specific gap spacing between plugs, connected by a thin flexible membrane, has a generally serpentine movement as it travels through the water.

It has also been discovered that a fishing lure with an airfoil type shape will provide lift to the fishing lure as it is pulled through the water.

It has been further discovered that a fishing lure, when properly weighted and provided with a diving bill structure, which results in a downward force on the lure, will droop in the water and counterbalance lift effects to the extent that it will travel through the water suspended without floating or sinking.

It has also been further discovered that a fishing lure, when provided with: a general configuration of multisegmented plugs, with a specific gap spacing between plugs, connected by a thin flexible membrane; an airfoil type shape to provide lift to the fishing lure as it is pulled through the water; a center of gravity weight near the front; a diving bill which results in a downward force on the lure and causes the structure to droop in the water and counterbalance lift effects to the extent that it will travel through the water suspended without floating at the surface of sinking; will, closely resemble a bait fish and move through the water in a generally serpentine or side to side motion at a depth beneath the surface of the water it is being dragged through.

It has been additionally discovered that the above fishing lure configuration is easily manufacturable.

It is an object of this invention to provide a general configuration of multisegmented plugs, with a specific gap spacing between plugs, connected by a thin flexible membrane, to provide a generally serpentine movement as it travels through the water.

It is also an object of this invention to provide a fishing lure with an airfoil type shape which will provide lift to the fishing lure as it is pulled through the water.

It is a further object of this invention to provide a fishing lure, when properly weighted and provided with a diving bill structure, which will droop in the water and counterbalance lift effects to the extent that it will travel through the water in a suspended manner without floating or sinking.

It is also a further object of this invention to provide a fishing lure which includes: a general configuration of multisegmented plugs, with a specific gap spacing between plugs, connected by a thin flexible membrane; an airfoil type shape to provide lift to the fishing lure as it is pulled through the water; a center of gravity weight; a diving bill which causes the structure to droop in the water and counterbalance lift effects to the extent that it will travel through the water suspended without floating at the surface or sinking; to thereby closely resemble a bait fish and move through the water in a generally serpentine or side to side motion at a depth below the surface of the water it is being dragged through.

It is an additional object of this invention to provide the above fishing lure in an easily manufacturable configuration.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective drawing of the lure showing the head, tail and middle sections with the diving bill at the head section.

FIG. 2 is a cross section of the lure taken along line 2—2 of FIG. 1, showing the head, tail and middle sections with features of diving bill, weight placement and hook locations.

FIG. 3 is a cross section of the lure taken along line 3—3 of FIG. 1, showing the flexible membrane dividing the two pluralities of sections.

FIG. 4 is a front perspective view of the preferred embodiment showing the diving bill and bill plate.

FIG. 5 is a side view cross section taken along line 5—5 of FIG. 4, which shows the lure head and its features.

FIG. 6 is a side view of the tail section of the lure, showing the tail shank fixture with hook attachment.

FIG. 7 is a side view of an alternative head securing means for a smaller version of the preferred embodiment of the lure.

FIG. 8 is a side view of the head section of the lure showing alternative orientations of the diving bill.

FIG. 9 is a side view of the neck section of the lure showing the weight placement and alternative placement locations.

FIG. 10 is a top view of the S-curve which the lure swims through when in motion.

FIG. 11 is an exploded view of the preferred embodiment which shows the flexible membrane sandwiched by the left and right sections of each segment.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further detailed in the appended claims.

Referring to FIG. 1, the lure 10 is shown with head segment 100, neck segment 200, tapered middle segment 300 and tail segment 400. Assorted segments are between these crucial segments. The lure 10 has a generally air-foil shape which develops a lift force on the lure as the lure moves through the water.

At the head segment 100 is a diving bill 110, which is secured by a bill plate 130, held in place by a ringed bolt leader attachment 120 and nut 140 attachment (see FIG. 2) which holds the diving bill 110 and bill plate 130 combination by clamping. Both the diving bill 110 and the bill plate 130 extent into the head segment 100 of the lure 10.

The neck segment 200 is adjacent to the head segment 100 and has a three pronged hook 230 secured at the lower side of the neck segment 200. There are three adjoining segments 240, 250 and 260 between the neck segment and the middle tapered segment 300. The number of these intermediate segments are not necessarily fixed and can vary.

The middle tapered segment 300 is slightly longer than the adjoining segments 240 and 260 and has a prominent taper which is more narrow toward the tail segment 400. Between the middle tapered segment 300 and the tail segment 400 are four more adjoining segments 310, 320, 330 and 340. Again, the number of these intermediate segments are not necessarily fixed and can vary.

At the tail segment 400 there is a tail hook fastening ring 430 from which another three pronged hook 410 is attached.

Referring to FIG. 2, a cross section of FIG. 1 taken along line 1—1 is shown. At the head segment 100, the diving bill 110, and the bill plate 130 secured by nut 140 and ringed bolt leader attachment 120 are shown.

In the neck segment 200, adjacent to the head segment 100, there is shown a center of gravity weight 210 placed in a neck segment cavity. Below the center of gravity weight 210 is a hook fastening ring 220 to which a three pronged hook 230 is attached.

Three adjoining segments 240 to 260 are between the neck segment 200 and the middle tapered segment 300. Between the middle tapered segment 300 and the tail segment 400 are four adjoining segments 310 to 340.

At the tail segment 400 there is a tail shank 420 which has a tail hook fastening ring 430 extended out the tail's end. Another three pronged hook 410 is attached to the tail's hook fastening ring 430.

Referring to FIG. 3, there is illustrated a cross sectional view taken along line 3—3 of FIG. 1. A thin flexible membrane 900 runs the length of the segments from the head segment 100 to the tail segment 400. The thin membrane 900 is generally made out of a cloth like material such as aircraft fiber. The thin membrane 900 can also be made out of numerous other materials including carbon fiber, stainless steel mesh, etc. The thin flexible membrane divides the segments into two pluralities of sections, a left half plurality of sections and a right half plurality of sections. The left and right half sections are symmetrical by reflection across the plane which divides the halves. The sections are affixed to the flexible membrane by means of an adhesive. The numbering as shown in FIG. 3 has the left half sections designed as "A", i.e. 100A, 200A, 240A, 250A, 260A, 300A, 310A, 320A, 330A, 340A and 400A. The numbering in FIG. 3 also has the right sections designated as "B", i.e. 100B, 200B, 240B, 250B, 260B, 300B, 310B, 320B, 330B, 340B and 400B.

The gap spacing G between the plugs is controlled such that the series of plugs may have a lateral curvature to the left or right. This gap spacing G determines the curvature of the lure's path through the water and can be tightened by the designer for narrow curves or loosened for wider curves.

Referring to FIG. 4, a perspective view of the head segment 100 is shown from the front. The diving bill 110 is shown secured by the bill plate 130 and ringed bolt leader attachment 120.

Referring to FIG. 5, a cross sectional view of the head segment 100 taken along line 5—5 of FIG. 4 is shown. The diving bill 110 is shown clamped by the ringed bolt leader attachment 120, bill plate 130 and nut 140. The bill plate and diving bill combination protrude from within a head cavity.

Referring to FIG. 6, the tail segment 400 is shown with the tail shank 420 extending into the tail cavity and the tail's hook attachment ring 430 protrudes from the tail segment 400. The tail segment 400 is longer than the proximal adjoining segments and acts like a rudder for stability.

Referring to FIG. 7, an alternative head segment 500, to supplant head segment 100 is shown with the ringed leader attachment 520 at the upper side of the diving bill 510 with a bolt shaft 530 running down the underside of the diving bill 510 and extending into the head cavity. This alternative head configuration could be used for smaller predator fish which do not require the use of the stronger bill plate, shown in FIG. 5, used to securely clamp the bill plate to the diving bill.

Referring to FIG. 8, the alternative head segment 500 is shown with alternative angular orientations for the diving bill 510. The lure will travel lower in the water as the diving bill becomes more horizontal, and higher in the water as the diving bill becomes more vertical.

Referring to FIG. 9, the center of gravity weight 210 within the neck segment 200 is shown where it can be placed at alternative locations within the neck segment 200. The lure will travel higher in the water as the center of gravity weight 210 is shifted toward the head segment 100 of the lure.

Referring to FIG. 10, a top view of a possible path by the preferred embodiment is shown; looking down into the water the lure will moving through the water in a generally serpentine or side to side manner. The straight line L indicates the line of pull and the curved dash line C indicates the path of swimming motion. The action of the lure is due to the lateral flexibility and swaying motion of the segments. This motion is a very unique action of the lure and is desirable because it resembles the motion of a small bait fish and causes the predator fish to strike.

Referring to FIG. 11, an exploded view of the preferred embodiment is shown with a side A and a side B and corresponding numerical identification to segment designation. The head sections are shown with left section 100A on one side and right section 100B on the other side sandwiching the flexible membrane 900. Additionally, the left neck section 200A and right section 200B is also sandwiching the flexible membrane 900. In a similar manner all of the segments have a left and right section which is affixed to the flexible membrane by means of an adhesive.

Defined in detail, the present invention is a flexible fishing lure comprising:
a. a multisegmented body including a head segment, a tail segment, a neck segment, a tapered segment between the tail and the neck segment, and a plurality of segments in between;
b. each segment of said multisegmented body consists of a left half diametric section and a right half diametric section which are symmetrical by reflection across the plane which divides the two halves;
c. a thin flexible membrane which connects the left half diametric section and right half diametric section to form a generally series arrangement of segments;
d. an arrangement of said right and left half sections affixed to said flexible membrane, sandwiching the flexible membrane by the sections, and which provides a gap spacing between the segments which permit respective adjacent segments to move side to side in a generally serpentine manner as the lure moves through the water;
e. a generally air-foil type exterior surface for providing lift to said lure;
f. a flat spoon like diving bill structure positioned at the head segment of the lure which causes downward movement as the lure moves through the water;
g. a leader line attachment proximal to the diving bill structure;
h. a means for attaching the diving bill to the head segment of the lure;
i. a center of gravity weight located at the neck of the lure;
j. at least one hook attachment at the tail segment of the lure; and
k. means for hingedly attaching said at least one hook attachment to said tail segment.

Defined broadly, the present invention is a flexible fishing lure comprising:
a. a multisegmented body including a head segment, neck segment, a tail segment, and at least one segment between the neck and tail segment;
b. at least one thin flexible membrane which connects the segments to form a generally series arrangement of segments;
c. a gap spacing between the segments which permit respective adjacent segments to move side to side in a generally serpentine manner as the lure moves through the water;
d. a generally air-foil type exterior surface for providing lift to said lure;
e. a diving bill structure positioned at the head segment of the lure;
f. a weight located near the head segment for adjusting the center of gravity of the lure; and
g. at least one hook attachment at the tail segment of the lure.

Defined alternatively, the present invention is a flexible fishing lure comprising:
a. a multisegmented body including a head segment, neck segment, a tail segment, and at least one segment between the neck and tail segment;
b. each segment of said multisegmented body comprises a left half diametric section and a right half diametric section which are symmetrical by reflection across the plane which divides the two halves;
c. a thin flexible membrane which connects the left half diametric section and right half diametric section to form a generally series arrangement of segments;
d. a gap spacing between the segments which permits respective adjacent segments to move side to side in a generally serpentine manner as the lure moves through the water;
e. a generally air-foil type exterior surface for providing lift to said lure;
f. a diving bill structure positioned at the head segment of the lure;
g. a weight located near the head segment for adjusting the center of gravity of the lure; and
at least one hook attachment at the tail segment of the lure.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A flexible fishing lure comprising:
   a. a multisegmented body including a head segment, a tail segment, a neck segment, a tapered segment between the tail and the neck segment, and a plurality of segments in between;
   b. each segment of said multisegmented body consist of a left half diametric section and a right half diametric section which are symmetrical by reflection across the plane which divides the two halves;
   c. a thin flexible membrane which connects the left half diametric section and right half diametric section to form a generally series arrangement of segments;
   d. an arrangement of said right and left half sections affixed to said flexible membrane, sandwiching the flexible membrane by the sections, and which provides a gap spacing between the segments which permits respective adjacent segments to move side to side in a generally serpentine manner as the lure moves through the water;
   e. a generally air-foil type exterior surface for providing lift to said lure;
   f. a flat spoon like diving bill structure positioned at the head segment of the lure which causes downward movement as the lure moves through the water;
   g. a leader line attachment proximal to the diving bill structure;
   h. a means for attaching the diving bill to the head segment of the lure, where the diving bill is attached by means of a bill plate which is secured by extending the bill plate into the head segment of the lure and thereby clamping the diving bill;
   i. a center of gravity weight located at the neck of the lure;
   j. at least one hook attachment at the tail segment of the lure; and
   k. means for hingably attaching said at least one hook attachment to said tail segment.

2. The flexible fishing lure in accordance with claim 1 where a nut and bolt clamps the bill plate to the diving bill.

3. The flexible fishing lure in accordance with claim 1 where the leader attachment is located at the head of a bolt which has a shank portion which is placed through the diving bill and secured at the lower side of the diving bill.

4. The flexible fishing lure in accordance with claim 1 with at least one additional hook attachment and means for hingably attaching said hook attachment to said multisegmented body.

5. The flexible fishing lure in accordance with claim 1 where the exterior surface of the lure is encased with a resin type material.

6. A flexible fishing lure comprising:
   a. a multisegmented body including a head segment, neck segment, a tail segment, and at least one segment between the neck and tail segment;
   b. at least one thin flexible membrane which connects the segments to form a generally series arrangement of segments;
   c. a gap spacing between the segments which permit respective adjacent segments to move side to side in a generally serpentine manner as the lure moves through the water;
   d. a generally air-foil type exterior surface for providing lift to said lure;
   e. a diving bill structure positioned at the head segment of the lure, where the diving bill is attached by means of a bill plate which is secured by extending the plate into the head segment of the lure and thereby clamping the diving bill;
   f. a weight located near the head segment for adjusting the center of gravity of the lure; and
   g. at least one hook attachment at the tail segment of the lure.

7. The flexible fishing lure in accordance with claim 6 where a nut and bolt clamps the bill plate to the diving bill.

8. The flexible fishing lure in accordance with claim 6 where a leader attachment is located at the head of a bolt which has a shank portion which is placed through the diving bill and secured at the lower side of the diving bill.

9. The flexible fishing lure in accordance with claim 6 further comprising at least one additional hook attachment and means for hingably attaching said hook attachment to said multisegmented body.

10. The flexible fishing lure in accordance with claim 6 where the exterior surface of the lure is encased with a resin type material.

11. A flexible fishing lure comprising:
    a. a multisegmented body including a head segment, neck segment, a tail segment, and at least one segment between the neck and tail segment;
    b. each segment of said multisegmented body comprises a left half diametric section and a right half diametric section which are symmetrical by reflection across the plane which divides the two halves;
    c. a thin flexible membrane which connects the left half diametric section and right half diametric section to form a generally series arrangement of segments;
    d. a gap spacing between the segments which permits respective adjacent segments to move side to side in a generally serpentine manner as the lure moves through the water;
    e. a generally air-foil type exterior surface for providing lift to said lure;
    f. a diving bill structure positioned at the head segment of the lure, where the diving bill is attached by means of a bill plate which is secured by extending the plate into the head segment of the lure and thereby clamping the diving bill;
    g. a weight located near the head segment for adjusting the center of gravity of the lure; and h. at least one hook attachment at the tail segment of the lure.

12. The flexible fishing lure in accordance with claim 11 where a nut and bolt clamps the bill plate to the diving bill and is secured at the lower side of the diving bill.

13. The flexible fishing lure in accordance with claim 11 where a leader attachment is located at the head of a bolt which has a shank portion which is placed through the diving bill.

14. The flexible fishing lure in accordance with claim 11 with at least one additional hook attachment and means for hingably attaching said hook attachment to said multisegmented body.

15. The flexible fishing lure in accordance with claim 11 where the exterior surface of the lure is encased with a resin type material.

16. A flexible fishing lure comprising:
   a. a multisegmented body including a head segment, a tail segment, a neck segment, a tapered segment between the tail and the neck segment, and a plurality of segments in between;
   b. each segment of said multisegmented body consists of a left half diametric section and a right half diametric section which are symmetrical by reflection across the plane which divides the two halves;
   c. a thin flexible membrane which connects the left half diametric section and right half diametric section to form a generally series arrangement of segments;
   d. an arrangement of said right and left half sections affixed to said flexible membrane, sandwiching the flexible membrane by the sections, and which provides a gap spacing between the segments which permits respective adjacent segments to move side to side in a generally serpentine manner as the lure moves through the water;
   e. a generally air-foil type exterior surface for providing lift to said lure;
   f. a flat spoon like diving bill structure positioned at the head segment of the lure which causes downward movement as the lure moves through the water;
   g. a leader line attachment proximal to the diving bill structure, where the leader attachment is located at the head of a bolt which has a shank portion which is placed through the diving bill and secured at the lower side of the diving bill;
   h. a means for attaching the diving bill to the head segment of the lure;
   i. a center of gravity weight located at the neck of the lure;
   j. at least one hook attachment at the tail segment of the lure; and
   k. means for hingably attaching said at least one hook attachment to said tail segment.

17. The flexible fishing lure in accordance with claim 16 where the diving bill is attached by means of a bill plate which is secured by extending the bill plate into the head segment of the lure and thereby clamping the diving bill.

18. The flexible fishing lure in accordance with claim 17 where a nut and bolt clamps the bill plate to the diving bill.

19. The flexible fishing lure in accordance with claim 16 with at least one additional hook attachment and means for hingably attaching said hook attachment to said multisegmented body.

20. The flexible fishing lure in accordance with claim 16 where the exterior surface of the lure is encased with a resin type material.

21. A flexible fishing lure comprising:
   a. a multisegmented body including a head segment, neck segment, a tail segment, and at least one segment between the neck and tail segment;
   b. at least one thin flexible membrane which connects the segments to form a generally series arrangement of segments;
   c. a gap spacing between the segments which permit respective adjacent segments to move side to side in a generally serpentine manner as the lure moves through the water;
   d. a generally air-foil type exterior surface for providing lift to said lure;
   e. a diving bill structure positioned at the head segment of the lure, where a leader attachment is located at the head of a bolt which has a shank portion which is placed through the diving bill and secured at the lower side of the diving bill;
   f. a weight located near the head segment for adjusting the center of gravity of the lure; and
   g. at least one hook attachment at the tail segment of the lure.

22. The flexible fishing lure in accordance with claim 21 where the diving bill is attached by means of a bill plate which is secured by extending the plate into the head segment of the lure and thereby clamping the diving bill.

23. The flexible fishing lure in accordance with claim 22 where a nut and bolt clamps the bill plate to the diving bill.

24. The flexible fishing lure in accordance with claim 21 further comprising at least one additional hook attachment and means for hingably attaching said hook attachment to said multisegmented body.

25. The flexible fishing lure in accordance with claim 21 where the exterior surface of the lure is encased with a resin type material.

26. A flexible fishing lure comprising:
   a. a multisegmented body including a head segment, neck segment, a tail segment, and at least one segment between the neck and tail segment;
   b. each segment of said multisegmented body comprises a left half diametric section and a right half diametric section which are symmetrical by reflection across the plane which divides the two halves;
   c. a thin flexible membrane which connects the left half diametric section and right half diametric section to form a generally series arrangement of segments;
   d. a gap spacing between the segments which permits respective adjacent segments to move side to side in a generally serpentine manner as the lure moves through the water;
   e. a generally air-foil type exterior surface for providing lift to said lure;
   f. a diving bill structure positioned at the head segment of the lure, where a leader attachment is located at the head of a bolt which has a shank portion which is placed through the diving bill;
   g. a weight located near the head segment for adjusting the center of gravity of the lure; and
   h. at least one hook attachment at the tail segment of the lure.

27. The flexible fishing lure in accordance with claim 26 where the diving bill is attached by means of a bill plate which is secured by extending the plate into the head segment of the lure and thereby clamping the diving bill.

28. The flexible fishing lure in accordance with claim 27 where a nut and bolt clamps the bill plate to the diving bill and is secured at the lower side of the diving bill.

29. The flexible fishing lure in accordance with claim 26 with at least one additional hook attachment and means for hingably attaching said hook attachment to said multisegmented body.

30. The flexible fishing lure in accordance with claim 26 where the exterior surface of the lure is encased with a resin type material.

* * * * *